Patented Apr. 22, 1947

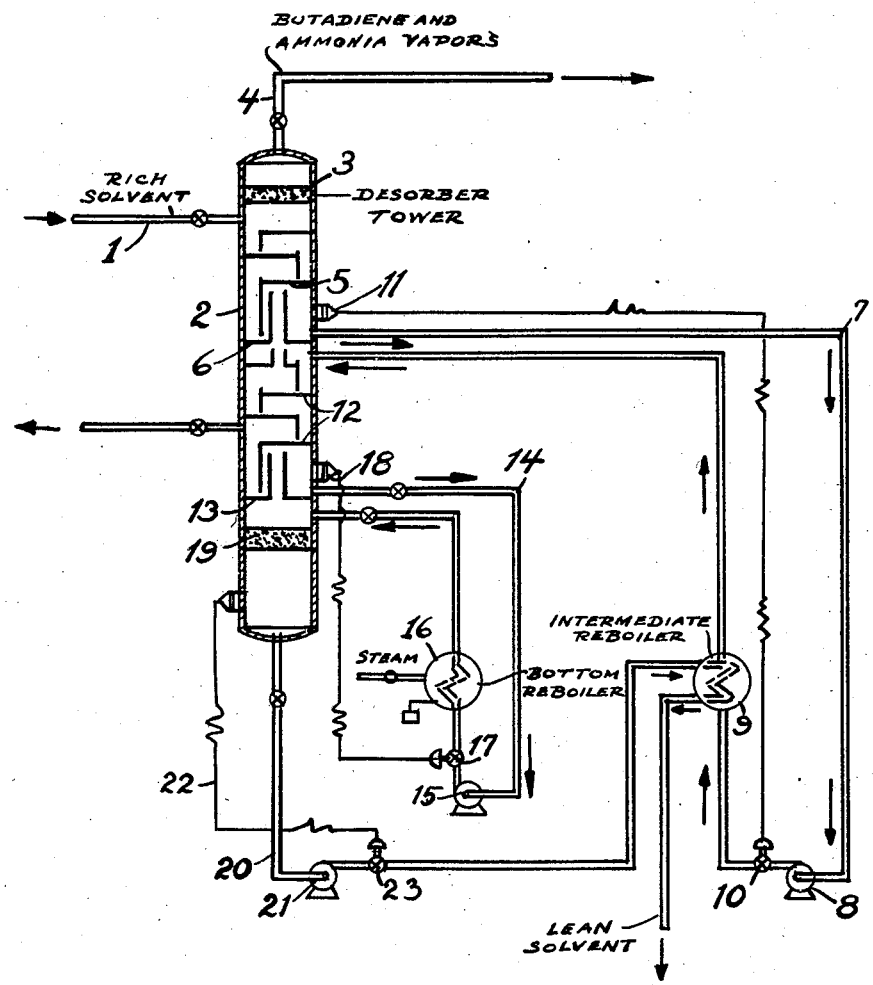

2,419,350

UNITED STATES PATENT OFFICE 2,419,350

BUTADIENE DESORPTION METHOD

Richard A. Given, Lake Charles, La., assignor to Standard Oil Development Company, a corporation of Delaware Application December 31, 1943, Serial No. 516,357

3 Claims. (Cl. 260—681.5)

This invention relates to improvements in the separation of a diolefin from an absorbent, and particularly for the separation of butadiene from a copper solvent in a substantially pure state.

Butadiene in a substantially pure state may be concentrated in a copper solvent such as ammoniacal cuprous acetate solution from a mixture of hydrocarbons, both saturated and unsaturated, containing a small fraction, that is, from about 10–20% or more of butadiene. The cuprous salt solution is then passed to a desorber and when the whole solution is gradually heated to recover the butadiene, substantial amounts of ammonia are passed overhead, which ammonia must be scrubbed out from the butadiene by means of water and reconcentrated for use in the absorption of more of the butadiene. Attempts have been made in the past to reabsorb the ammonia by refluxing a part of the butadiene to keep the temperatures at the upper part of the desorber low or by adding a part of the solvent to the top of the desorber tower as a cold reflux. In both of these practices where butadiene is refluxed only a small amount of the ammonia passing overhead is reabsorbed. Where the solvent is charged to the top of the desorber tower as cold reflux, larger amounts of the ammonia are reabsorbed but at the same time substantial amounts of the butadiene are likewise reabsorbed.

An object of this invention is to provide for the reabsorption of greater amounts of the ammonia that tend to pass overhead together with the butadiene.

Another object of this invention is to provide for a greater amount of heat exchange between the solvent fraction containing a larger amount of butadiene and the solvent fraction from which the greater part of the butadiene has been expelled.

Another object is to lower the vapor load within the desorber and therefore reduce the tendency to foam and form emulsions.

According to this invention a solution of ammoniacal cuprous acetate containing butadiene dissolved in essentially a pure state and at a temperature of 80° F. and under a pressure of 6–25 lbs./sq. in. gauge is passed by means of pipe 1 into the upper part of a desorber tower 2 containing a packed section 3 above the plates into which this rich solvent is introduced. An outlet for butadiene and ammonia vapors at the top of the tower is provided. The upper part of the tower is provided with plates 5 over which the rich solvent flows downwardly into pan 6. From pan 6 the ammoniacal cuprous acetate solution containing dissolved butadiene is withdrawn by means of pipe 7 and passed by means of pump 8 through heat exchanger 9 and returned to a point below pan 6. A valve 10 with control means 11 as to level of solvent in pan 6 is used to regulate the flow of the ammoniacal cuprous acetate solution containing butadiene which is heated and returned to the desorber tower 2. A temperature of about 140° F. is maintained in the section of the tower below pan 6 without any substantial changes in the pressure. The ammoniacal cuprous acetate solution passes downwardly over plates 12 to pan 13. The ammonia and the butadiene that are expelled pass upwardly through the tower in countercurrent flow to the cuprous acetate solution that is introduced into desorber tower 2 by pipe 1. The ammoniacal cuprous acetate solution is withdrawn from pan 13 by means of pipe 14 and passed by means of pump 15 through heat exchanger 16 into a lower part of the desorber tower 2 below pan 13 where a temperature of about 180° F. is maintained. Level control valve 17 with level control means 18 is provided to regulate the flow of this solvent. The temperature of this solvent is controlled by adjustment of the amount of steam supplied to the bottoms reboiler 16. The ammoniacal cuprous acetate solution substantially free of butadiene after passing through packed section 19 is withdrawn from the lower part of the desorber tower 2 by means of pipe 20 and circulated by means of pump 21 through heat exchanger 9 and after further cooling is recycled to the absorption tower, not shown. Valve 23 with level control means 22 is provided to maintain the desired flow from the bottom of the desorber tower 2. The plates in the tower may be bubble plates or packed sections. In the intermediate flashing, a fairly large amount of ammonia is released with the flashed butadiene. In the bottom flashing, a large quantity of ammonia is released with the butadiene. In each case, the vapors pass upward through the bubble plates or packed sections of the tower countercurrent to the downflowing colder solvent. This solvent reabsorbs most of the ammonia from the vapors so that the vapor leaving the top of the tower is pure butadiene with only a small amount of ammonia.

What is claimed is:

1. In the desorption of butadiene from an ammoniacal cuprous acetate solution containing butadiene dissolved therein, the process which comprises passing said solution into a first desorbing zone, withdrawing desorbed butadiene from said first zone, removing said solution from said first zone and heating it to a temperature higher than in said first zone, introducing said heated solution into a second desorbing zone, passing desorbed vapors comprising butadiene and ammonia from said second zone countercurrent to said solution in said first zone, withdrawing said solution from said second zone and further heating it to a temperature higher than said first mentioned heating, introducing said further heated solution into a third desorbing zone, passing desorbed vapors comprising butadiene and ammonia from said third zone countercurrent to said solution in said second zone, and withdrawing from said third zone said solution substantially free of butadiene.

2. In the desorption of butadiene from an ammoniacal cuprous acetate solution containing butadiene dissolved therein, the process which comprises passing said solution at a temperature of approximately 80° F. into a first desorbing zone, withdrawing desorbed butadiene from said first zone, removing said solution from said first zone and heating it to a temperature of about 140° F., introducing said heated solution into a second desorbing zone, passing desorbed vapors comprising butadiene and ammonia from said second zone countercurrent to said solution in said first zone, withdrawing said solution from said second zone and further heating it to a temperature of approximately 180° F., introducing said further heated solution into a third desorbing zone, passing desorbed vapors comprising butadiene and ammonia from said third zone countercurrent to said solution in said second zone, and withdrawing from said third zone said solution substantially free of butadiene.

3. A process as defined in claim 1 wherein said ammoniacal cuprous acetate solution is introduced into said first desorbing zone under a gage pressure of 6 to 25 pounds per square inch.

RICHARD A. GIVEN.

REFERENCES CITED

The following references are of record in the file of this patent:

UNITED STATES PATENTS

| Number | Name | Date |
|---|---|---|
| 2,035,409 | Ruthruff et al. | Mar. 24, 1936 |
| 2,196,878 | Stover | Apr. 8, 1940 |
| 1,919,594 | Lewis | July 25, 1933 |
| 1,934,029 | Asbury | Nov. 7, 1933 |
| 2,154,676 | Haeuber et al. | Apr. 18, 1939 |
| 1,977,659 | Watts | Oct. 23, 1934 |